US011034017B2

(12) United States Patent
Manfredi (10) Patent No.: US 11,034,017 B2
(45) Date of Patent: Jun. 15, 2021

(54) SOFT ACTUATORS (71) Applicant: University of Dundee, Scotland (GB)

(72) Inventor: Luigi Manfredi, Dundee (GB)

(73) Assignee: UNIVERSITY OF DUNDEE, Dundee (GB)

( * ) Notice: Subject to any disclaimer, the term of this patent is extended or adjusted under 35 U.S.C. 154(b) by 34 days.

(21) Appl. No.: 16/339,899

(22) PCT Filed: Oct. 24, 2017

(86) PCT No.: PCT/GB2017/053199
§ 371 (c)(1),
(2) Date: Apr. 5, 2019

(87) PCT Pub. No.: WO2018/078347
PCT Pub. Date: May 3, 2018

(65) Prior Publication Data
US 2020/0039065 A1 Feb. 6, 2020

(30) Foreign Application Priority Data

Oct. 24, 2016 (GB) ...................... 1617934

(51) Int. Cl.
*B25J 9/10* (2006.01)
*F15B 15/02* (2006.01)
(Continued)

(52) U.S. Cl.
CPC ............... *B25J 9/142* (2013.01); *B25J 9/144* (2013.01); *B25J 9/146* (2013.01); *B25J 19/068* (2013.01); *F15B 15/06* (2013.01); *F15B 2215/00* (2013.01)

(58) Field of Classification Search
CPC ..... B25J 9/14; B25J 9/142; B25J 9/144; B25J 9/146; B25J 15/0023; B25J 15/0028;
(Continued)

(56) References Cited

U.S. PATENT DOCUMENTS 3,712,481 A * 1/1973 Harwood ................... B25J 9/06
414/736
4,108,050 A * 8/1978 Paynter ................. F15B 15/103
251/59

(Continued)

FOREIGN PATENT DOCUMENTS

JP H02284887 A 11/1990
JP 2000334687 A 12/2000

OTHER PUBLICATIONS

International Search Report PCT/ISA/210 for International Application No. PCT/GB2017/053199 dated Feb. 2, 2018.
(Continued)

*Primary Examiner* — Adam D Rogers
(74) *Attorney, Agent, or Firm* — Harness, Dickey & Pierce, P.L.C.

(57) ABSTRACT

An actuator includes first and second ends defining an axis there between, and at least four inflatable chambers. Each inflatable chamber is resiliently deformable, elongate, and extends axially between the first and second ends and circumferentially about a central core defined between the ends and by the inflatable chambers. A first pair of the four inflatable chambers is contra rotatory about the core to a second pair of the four inflatable chambers. A pressure change in one or more of the inflatable chambers causes motion of the first end relative to the second end. The actuators can be employed in robots or robotic arms.

11 Claims, 9 Drawing Sheets

(51) Int. Cl.
   *B25J 9/14* (2006.01)
   *B25J 19/06* (2006.01)
   *F15B 15/06* (2006.01)
(58) Field of Classification Search
   CPC ...... B25J 15/0052; B25J 19/068; F15B 15/06; F15B 2215/00
   See application file for complete search history.

(56) References Cited

U.S. PATENT DOCUMENTS

| | | | | |
|---|---|---|---|---|
| 4,551,061 | A | * | 11/1985 | Olenick .................. B25J 18/06 414/735 |
| 4,792,173 | A | * | 12/1988 | Wilson .................. B25J 9/1075 294/119.3 |
| 9,713,873 | B2 | * | 7/2017 | Cheng ................ A61B 1/00147 |
| 9,930,764 | B2 | * | 3/2018 | MacLaughlin ...... A61B 6/4405 |
| 10,028,855 | B2 | * | 7/2018 | Popovic .................. A61F 5/01 |
| 2003/0149338 | A1 | | 8/2003 | Francois et al. |
| 2009/0314119 | A1 | | 12/2009 | Knoll |
| 2012/0166609 | A1 | | 6/2012 | Liu et al. |

OTHER PUBLICATIONS

Written Opinion of the International Searching Authority PCT/ISA/237 for International Application No. PCT/GB2017/053199 dated Feb. 2, 2018.
L. Sciavicco, B. Siciliano, and B. Sciavicco, Modelling and Control of Robot Manipulators, 2nd ed. Secaucus, NJ, USA: Springer-Verlag New York, Inc., 2000.
B. Vanderborght et al., "Variable impedance actuators: A review," Robotics and Autonomous Systems, vol. 61, No. 12, pp. 1601-1614, 2013. [Online]. Available: http://www.sciencedirect.com/science/article/pii/S0921889013001188.
D. Rus and M. T. & Tolley, "Design, fabrication and control of soft robots." Nature, vol. 521, pp. 467-475, 2015. [Online]. Available: http://www.nature.com/nature/journal/v521 /n7553/abs/nature14543.html.
C. Laschi et al., "Soft robot arm inspired by the octopus," Advanced Robotics, vol. 26, No. 7, pp. 709-727, 2012. [Online]. Available: http://dx.doi.org/10.1163/156855312X626343.
B. Mazzolai et al., "Soft-robotic arm inspired by the octopus: Ii. from artificial requirements to innovative technological solutions," Bioinspiration & Biomimetics, vol. 7, No. 2, p. 025005, 2012. [Online]. Available: http://stacks.iop.org/1748-3190/7/i=2la=025005.
M. Cianchetti et al., "Design concept and validation of a robotic arm inspired by the octopus," Materials Science and Engineering: C, vol. 31, No. 6, pp. 1230-1239, 2011, principles and Development of Bio-Inspired Materials. [Online]. Available: http://www.sciencedirect.com/science/article/pii/S0928493110003450.
M. W. Hannan and I. D. Walker, "The 'elephant trunk' manipulator, design and implementation," in Advanced Intelligent Mechatronics, 2001. Proceedings. 2001 IEEE/ASME International Conference on, vol. 1, 2001, pp. 14-19 vol. 1.
Y. Yang and W. Zhang, "An elephant-trunk manipulator with twisting flexional rods," in 2015 IEEE International Conference on Robotics and Biomimetics (ROBIO), Dec. 2015, pp. 13-18.
M. Rolf and J. J. Steil, "Efficient exploratory learning of inverse kinematics on a bionic elephant trunk," IEEE Transactions on Neural Networks and Learning Systems, vol. 25, No. 6, pp. 1147-1160, Jun. 2014.
H.-T. Lin, G. G. Leisk, and B. Trimmer, "Goqbot: a caterpillar-inspired softbodied rolling robot," Bioinspiration & Biomimetics, vol. 6, No. 2, p. 026007, 2011. [Online]. Available: http://stacks.iop.org/1748-3190/6/i=2la=026007.
G. Sumbre et al., "Octopuses use a human-like strategy to control precise point-to-point arm movements," Current Biology, vol. 16, No. 8, pp. 767-772, 2006. [Online]. Available: http://www.sciencedirect.com/science/article/pii/S096098220601 27 4 7.

L. Margheri, C. Laschi, and B. Mazzolai, "Soft robotic arm inspired by the octopus: I. from biological functions to artificial requirements," Bioinspiration & Biomimetics, vol. 7, No. 2, p. 025004, 2012. [Online]. Available: http://stacks.iop.org/1748-3190/7/i=2la=025004.
B. Tondu, "Modelling of the McKibben artificial muscle: A review," Journal of Intelligent Material Systems and Structures, vol. 23, No. 3, pp. 225-253, 2012. [Online]. Available: http://jim.sagepub.com/content/23/3/225.abstract.
F. Rothling et al., "Platform portable anthropomorphic grasping with the bielefeld 20-DOF shadow and 9-DOF turn hand," in 2007 IEEE/RSJ International Conference on Intelligent Robots and Systems, Oct. 2007, pp. 2951-2956.
B.-S. Kang, "Compliance characteristic and force control of antagonistic actuation by pneumatic artificial muscles," Meccanica, vol. 49, No. 3, pp. 565-574, 2014. [Online]. Available: http://dx.doi.org/10.1007/s11012-013-9811-y.
K. Suzumori et al., "Flexible microactuator for miniature robots," in Micro Electro Mechanical Systems, 1991, MEMS '91, Proceedings. An Investigation of Micro Structures, Sensors, Actuators, Machines and Robots. IEEE, Jan. 1991, pp. 204-209.
K. Suzumori et al., "Development of flexible microactuator and its applications to robotic mechanisms," in Robotics and Automation, 1991. Proceedings., 1991 IEEE International Conference on, Apr. 1991, pp. 1622-1627 vol. 2.
F. Connolly et al., "Mechanical programming of soft actuators by varying fiber angle," Soft Robotics, vol. 2, pp. 26-32, 2015.
R. F. Shepherd et al., "Multigait soft robot," Proceedings of the National Academy of Sciences, vol. 108, No. 51, pp. 20 400-20 403, 2011. [Online]. Available: <http://www.pnas.org/content/108/51/20400.abstract>.
R. V. Martinez et al., "Soft actuators and robots that are resistant to mechanical damage," Advanced Functional Materials, vol. 24, No. 20, pp. 3003-3010, 2014. [Online]. Available: http://dx.doi.org/10.1002/adfm.201303676.
S. W. Kwok et al., "Magnetic assembly of soft robots with hard components," Advanced Functional Materials, vol. 24, No. 15, pp. 2180-2187,2014. [Online]. Available: http://dx.doi.org/10.1002/adfm.201303047.
R. K. K. Andrew D. Marchese and D. Rus, "A recipe for soft fluidic elastomer robots," Soft Robotics, vol. 1, No. 2, pp. 7-25, 2015. [Online]. Available: http://online.liebertpub.com/doi/abs/10.1089/soro.2014.0022.
Octopus IP, FP7-ICT Aug. 5, 2007, FET Proactive, Embodied Intelligence, url=http://www.octopus-project.eu.
Stiff-Flop IP, FP7-ICT—Feb. 1, 2011, Cognitive Systems and Robotics, url=http://www.stiff-flop.eu/.
M. Cianchetti et al., "Stiff-flop surgical manipulator: Mechanical design and experimental characterization of the single module," in 2013 IEEE/RSJ International Conference on Intelligent Robots and Systems, Nov. 2013, pp. 3576-3581.
C. D. Onal et al., Soft Mobile Robots with On-Board Chemical Pressure Generation. Cham: Springer International Publishing, 2017, pp. 525-540.
M. Wehner et al., "An integrated design and fabrication strategy for entirely soft, autonomous robots," Nature, vol. 536, pp. 451-466, 2016.
R. J. Webster and B. A. Jones, "Design and kinematic modeling of constant curvature continuum robots: A review," The International Journal of Robotics Research, 2010. [Online]. Available: http://ijr.sagepub.com/content/early/2010/06/09/0278364910368147.abstract.
T. Ranzani et al., "A bioinspired soft manipulator for minimally invasive surgery," Bioinspiration & Biomimetics, vol. 10, No. 3, p. 035008, 2015. [Online]. Available: http://stacks.iop.org/1748-3190/1 0/i=3la=035008.
A. D. Greef et al., "Towards flexible medical instruments: Review of flexible fluidic actuators," Precision Engineering, vol. 33, No. 4, pp. 311-321, 2009. [Online]. Available: http://www.sciencedirect.com/science/article/pii/S0141635908001190.

* cited by examiner

SOFT ACTUATORS

CROSS-REFERENCE TO RELATED APPLICATIONS

This application is a national phase under 35 U.S.C. § 371 of PCT International Application No. PCT/GB2017/053199 which has an International filing date of Oct. 24, 2017, which claims priority to Great Britain Application No. 1617934.3, filed Oct. 24, 2016, the entire contents of each of which are hereby incorporated by reference.

FIELD OF THE INVENTION

The invention relates to an actuator that can combine flexibility and dexterity in four degrees of freedom (4 DOFs). The invention also relates to robots and robotic arms comprising the actuator or a plurality of actuators. Methods of manufacture are also provided.

BACKGROUND TO THE INVENTION

During the last decades, roboticists have moved from designing rigid and heavy robots to soft and light ones. The rigidity was one of the requirements, mostly related to high precision and high mechanical bandwidth, essential for some industrial applications. As described by Sciavicco and Siciliano, an industrial robot is defined as a combination of rigid links [1].

Due to the need for safe interaction with humans and to avoid collateral damage, researchers started to explore compliant robots made by using active control and rigid links, or by using materials that are intrinsically compliant [2]. Taking inspiration from nature, a different approach paved the way for soft robotics (SR) [3], based on, for example, the physiology and biomechanics of the octopus [4], [5], [6], the elephant trunk [7], [8], [9], or the caterpillar [10]. Soft materials are adopted to design novel high-compliant actuators and sensors. In sharp contrast to rigid robots, soft robots have continuously deformable soft structures with high adaptation and agility. They may be composed of material with different stiffness. Bio-inspired control has also been investigated [11], [12].

One of the first pneumatic actuators was reported by McKibben, in the 1950's, proposing a design able to provide a pull-force like human muscles [13]. It consisted of an inner rubber tube with a braided polyester mesh sleeve. This design has been used in antagonistic configuration, obtaining a system able to change its stiffness by controlling the air pressure in each actuator [14], [15].

Differently from this approach, new designs of soft actuators can produce different movements, i.e. pushing, bending or twisting forces. Suzumori et al., at Toshiba Corporation, developed a 3 degrees of freedom (DOFs) pneumatic microactuator composed of three chambers, with an external diameter of 12 mm and total length of 120 mm [16]. The actuator was made from fibre reinforced rubber and actuated by electro-pneumatic or electro-hydraulic systems. Performance of the system was variously reported as a single actuator, as a micro manipulator and as a small walking quadruped [17].

Connoly et al. proposed a mechanical programmable soft actuator by using fibre-reinforcements [18]. A wide range of motion was demonstrated by varying the fibre angle, with 1 DOF of motion: i) extension, ii) bending, iii) twisting, and iv) contracting. Performance was demonstrated by using a simulator and validated by experimentally characterizing the actuators. A walking soft robot was proposed by Shepherd et al., by using soft lithography [19]. This robot was composed of 5 soft actuators and able to perform locomotion without using sensors. Martinez et al showed the high resistance to mechanical damage of soft robots [20]. Kwork et al. reported several combinations of mechanisms for soft robots with hard components, and designed a soft grip with four legs [21]. Each leg can bend in one direction and they are all connected together by using a central inactive part. Marchese et al. reported a detailed description for the design and fabrication of soft actuators by using different techniques [22]. This report provides a useful description of the moulding process and choice of the materials for different actuators and their performance.

In Europe, the first FP7 European project on soft robotics, was the OCTOPUS (Novel Design Principles and Technologies for a New Generation of High Dexterity Soft-bodied Robots Inspired by the Morphology and Behaviour of the Octopus), led by Cecilia Laschi [23]. Aims of the project were to investigate the sensory-motor abilities of the Octopus model, by studying the animal physiology and implementing novel technologies for soft robotics. One of the outcomes of this project was the design and fabrication of a flexible tentacle able to change its shape by using a combination of soft and smart material, i.e. shape memory alloy (SMA).

STIFF-FLOP (Stiffness Controllable Flexible & Learnable Manipulator for Surgical Operations), led by Kaspar Althoefer, aimed to apply a soft actuation approach for minimal access surgery (MAS) [24]. The design was biologically inspired taking the octopus as a model. The consortium built a robotic soft manipulator composed of three modules with 3 DOFs each, able to change its stiffness with an on-off mechanism by using coffee powder [25].

Limitations in the design of autonomous soft robots, are the need for an external pump to inflate the chambers, and valves and tubes for their inter-connection. These components are made of rigid parts, may be heavy, thereby imposing a limitation to soft design. Preliminary attempt to produce air by a chemical reaction was made by Onal et al. by means of an on-board chemical pressure generator [26].

Wehner et al., recently published a work reporting an untethered octopus robot with a structure and all the needed components being made of soft materials, by using lithography [27]. On board gas-generator was controlled to inflate the chambers. This is the first soft robot with a complete set of on-board flexible components, paving the way for the next generation of soft robots.

In a review, Webster and Jones, reported various kinematic models to perform a constant curvature continuum robots, by describing the mechanical solution and the mathematical models [28]. Other reports have described pneumatic solutions for bendable actuators, with use of three straight chambers for a total of 3DOFs [29], [30]. Each chamber produces a pushing force, which bend the actuator in one direction. The combined activation of the chambers, results in 2 DOFs bending and extension of the actuator, with simultaneous inflation of the 3 chambers. By having a straight chamber configuration, the actuator bends following a plane connected from the mid-section of the chamber, and the central-section of the actuator.

Combining several DOFs in a single actuator, allow dexterity of a soft robotic system. Accordingly, there is a continuing need for improved actuators to take advantage of these possibilities.

DESCRIPTION OF THE INVENTION

The present invention provides an actuator comprising:
first and second ends defining an axis there between; and at least four inflatable chambers;
wherein each inflatable chamber is resiliently deformable, elongate, and extends axially between the first and second ends and circumferentially about a central core defined between the ends and by the inflatable chambers;
wherein a first pair of the four inflatable chambers is contra rotatory about the core to a second pair of the four inflatable chambers;
whereby a pressure change in one or more of the inflatable chambers causes motion of the first end relative to the second end.

Changes of pressure within the resiliently deformable, elongate, inflatable chambers causes deformation, resulting in motion of the first end relative to the second end. As described in more detail hereafter, the provision of the four chambers can allow the actuator to operate with four degrees of freedom motion (4 DOFs). Taking the axis between the first and second ends as the z axis, the first end may rotate (twist) about the z axis with respect to the second end and may also extend away from the second end along the z axis (2 DOFs). Appropriate operation of the inflatable chambers allows bending about the orthogonal x and y axes as desired (a further 2 DOFs).

Thus the actuator can bend, twist and extend with a wide range of motions made possible by the combination of the 4 DOF motions.

More than four inflatable chambers may be provided to provide further options for directing motion or to strengthen the force of motion.

Each inflatable chamber extends axially between the first and second ends and circumferentially about a central core defined between the ends. For example each inflatable chamber may extend between the ends in a spiral (helical) or generally spiral fashion with a shape generally following the outer envelope of the central core.

A first pair of the four inflatable chambers is contra rotatory about the core to a second pair of the four inflatable chambers. Thus there will be two chambers extending 'clockwise' and two chambers extending 'anti-clockwise' about the central core (as in left handed and right handed screw threads).

The four chambers may be spaced circumferentially about the core in different ways. Typically, to provide substantially consistent control and force of motion in each direction, the inflatable chambers may be distributed symmetrically or generally symmetrically about the central core.

In a convenient and effective arrangement the four inflatable chambers alternate circumferentially, one from the first pair then one from the second pair so as to be distributed in a zig zag fashion about the central core. The ends of chambers may be close together or even in contact where they converge at the ends of the actuator i.e. viewed with the z axis upright, the elongate inflatable chambers give what may be described as a generally alternating 'V' then 'A' appearance around the outside of the core. (The 'A' shape is an inverted V [Λ]). Thus where only four chambers are employed, there may be two V shapes and two A shapes alternating around the circumference of the central core.

Alternatively one from the first pair and one from the second pair of inflatable chambers may cross each other, as they extend between the first and second ends, for example in a generally X shaped fashion. The second of the first pair and the second of the second pair can also form an X. The Xs may be disposed diametrically opposite each other about the core.

The central core may be hollow. A hollow central core is convenient to allow the passage of control components such as pneumatic or hydraulic piping, electrical power or signal wires. Other components may be included, for example fibre optic cabling for signalling, transmission of light, or to carry camera images. As an alternative to a hollow central core the at least four inflatable chambers may be self-supporting in use (i.e. at least when partially inflated) and the central core may be a space between them. The space is defined by the two ends and the shaping of the at least four inflatable chambers about this core space.

The four inflatable chambers may each be attached to a central core of a resiliently deformable material. With such an arrangement the chambers may be supported by the core material and the core material deforms co-operatively in response to the changes in pressure within the inflatable chambers. Conveniently the inflatable chambers and the central core may be produced as a one piece unit, for example by a moulding process. The moulding process produces a unit comprising the central core and the four chambers.

Furthermore by choosing core and chamber material properties, the deformability of the actuator can be adjusted to suit the intended use. Chamber and core material properties may be the same or different. Typically the core connects to each end of the actuator, but need not do so, for example if the chambers extend to and connect to the first and second ends.

Alternatively the chambers may be supported by being located within (i.e. embedded in or formed in) a body of a resiliently deformable material. The body may be hollow. As a yet further alternative the chambers may be supported by being attached to a resiliently deformable material located outside the core e.g. a hollow body with the chambers attached to an inside surface, where the core is a space.

Where the central core is of resiliently deformable material it may be generally cylindrical in form. It may be hollow. Thus the present invention provides an actuator comprising a hollow cylinder with four curved symmetric inflatable chambers on its surface. The curved shape of the chambers produces a diagonal force along the hollow internal cylinder.

Each inflatable chamber of the four may extend into direct operational contact with both the first and second ends. Thus elongation and contraction of the chambers, caused by pressure changes, may act directly on the first and second ends. Alternatively, where the chambers are supported by a resilient core of deformable material as discussed above; and the core connects to the first and second ends, then the chambers need not extend to direct operational contact with the ends as the motion can be transmitted to the ends by the supporting material.

The first and second ends may be provided with one or more grooves or slots that accept an end or ends of the chambers and/or the central core. This can assist in providing consistent driving of the first and second ends relative to each other.

The first and second ends are driven to move one relative to the other by the action of the inflatable chambers. It is preferred that the first and second ends are relatively stiff, typically at least stiffer than the central core and/or the material of the inflatable chambers. The stiff first and second ends allow precise and repeatable motion, desirable where the actuator is employed in a robot.

The first and second ends may each be provided with an aperture extending there through. The aperture may be in the axial direction and in communication with the central core. Thus where the central core is hollow (or is a space), passage of control components through the both the core and through at least one of the ends can be arranged.

The material of the inflatable chambers and the core material (when used) is/are resiliently deformable. Elastomer materials may be employed, for example natural and/or synthetic rubber, such as silicone rubber. The material of the first and second ends will normally be stiffer, therefore the ends may be formed from a different material, such as a plastic with more limited or even no significant deformability in use. Alternatively the ends may use the same or similar materials to those employed for the chambers and core, but the ends may be stiffened, for example by reinforcement with stiffer materials such as harder elastomers, plastics or even metals.

More generally the choice of materials of construction will be selected depending on factors such as the required actuator stiffness and size. This in turn depends on the load to be supported by the actuator, the required response time and movement speed of the actuator; and the desired range of fluid pressures employed to drive the device.

The motion of the actuator ends is driven by pressure changes in the inflatable chambers. Thus the actuator may further comprise pressure means for selectively increasing and/or decreasing the pressure within each of the four inflatable chambers by supply of a fluid. The fluid may be a gas (pneumatic operation) or a liquid (hydraulic operation). Thus the pressure means may be a pneumatic circuit supplying a gas or a hydraulic circuit supplying a liquid. Fluid can be delivered (and removed) to the inflatable chambers by piping from a pump arrangement of the circuit, for example. Motion can be caused by increasing pressure (inflation) and/or by reducing pressure (evacuation).

Pneumatic operation may be preferred as the compressibility of gases allows more deformability in the actuator, even when the chambers are inflated to a maximum pressure.

Control means for controlling pressure changes within the at least four inflatable chambers may be provided. For example the control means can selectively open and close valves to allow a supply of a gas to inflate or deflate the four inflatable chambers in accordance with an operator input commanding a particular motion from the actuator. The operator input may be by means of a joystick input to a computer control system for example.

According to a further aspect the present invention provides a robot or a robotic arm comprising at least one, typically a plurality, of actuators according to the invention as described herein.

In a robot or robotic arm at least two of the plurality of actuators may be connected end to end. End to end connection may be by attaching (e.g. by bonding or mechanical fixing) an end of one actuator to an end of another actuator. Alternatively end to end connection may be by having an end in common. (An end of a first actuator is also an end of a second actuator.) Within one robot or robotic arm end to end connections may be of either or even both types. As the actuators each provide 4 DOF motion a robot or robotic arm comprising a number of the actuators connected end to end can provide a versatile range of motion including significant extension of length.

DETAILED DESCRIPTION OF THE INVENTION WITH REFERENCE TO SOME EMBODIMENTS

As described below, as an embodiment of the invention, the inventors have designed a hollow soft pneumatic actuator (HOSE), made of silicone rubber Eco-Flex® 00-30 with the top and bottom sections (first and second ends) reinforced by 3D printed parts. This novel approach allows the actuator to bend in two directions, extend and twist along each axis, with a total 4 DOFs and high dexterity in its movements. The manufacturing process is described herein and the performance in terms of range of motion and applied pressure, described and discussed.

The first and second ends of the actuator are reinforced by using 3D printed parts to avoid deformation of the ends. Different activation combinations of the 4 chambers result in different movements of the actuator. The chambers are constructed from thin walled (0.5 mm), Ecoflex® 00-30 super soft silicon rubber enabling the actuator to perform the movements with a maximal pressure of 4.2 psi.

In the exemplary embodiment, discussed below, the invention provides a hollow soft pneumatic actuator with an external diameter of 30 mm, internal diameter of 5 mm, overall length of 40 mm, and a total weight of circa 9.4 grams.

The actuator of the exemplary embodiment can extend more than 300% of its original length, bend up to ±90° along X axis, ±115° along Y axis, and twist with a total range of ±30°, along the Z axis.

Referring to FIG. 1a, 1b, 1c, the actuator 1 comprises four inflatable chambers C1, C2, C3 and C4. The curved chambers have a rectangular section, surrounding a central hollow cylinder 2 which constitutes a central core of the device. The chambers (C1, C2, C3, C4) extend between a first end 4 and a second end 6 and circumferentially about the cylinder 2. The ends 4,6 have apertures 7 providing access to the hollow centre of cylinder 2, thus providing an aperture 8 through the centre of the actuator 1. FIG. 1a includes an illustration of the orthogonal X, Y and Z axes, the Z axis direction being defined by the first and second ends.

The chambers and the cylinder 2 are of a resiliently deformable silicone rubber. The chamber and cylinder may be a single, one piece moulding as in this example, or the chambers may be applied (e.g. bonded) to cylinder 2. The first and second ends 4,6 are more rigid, of a relatively hard plastics material and are bonded to the cylinder 2 and ends of the chambers 4,6.

Two of the four inflatable chambers spiral upwards about the cylinder 2 in a clockwise direction when viewed from above (first pair C1 and C3) and the other two in an anti-clockwise direction (second pair C2 and C4).

Figure 1:
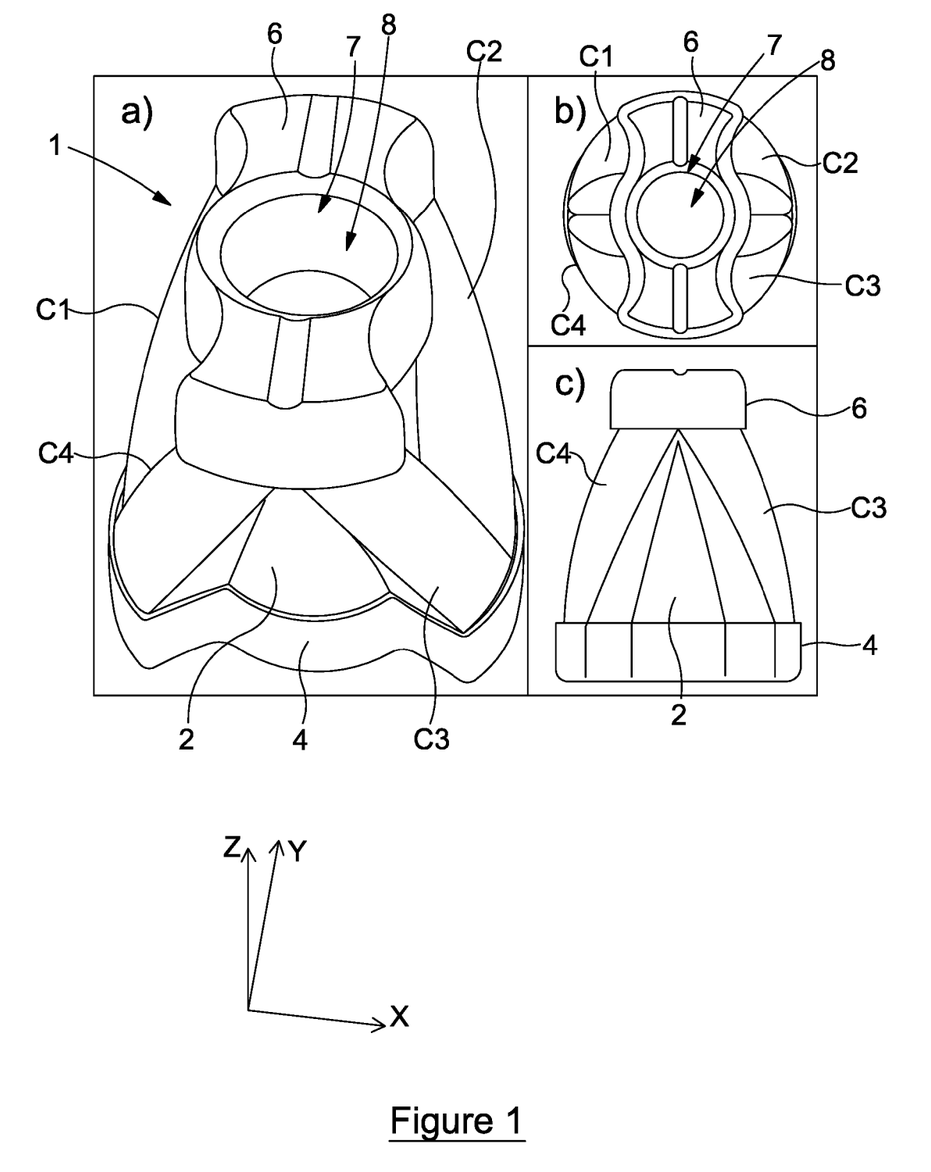
FIG. 1a Shows an actuator in perspective view.
FIG. 1b shows the same actuator in a top (plan) view.
FIG. 1c shows a front elevation view.

The four inflatable chambers alternate circumferentially: one from the first pair (C1); then one from the second pair (C2); then the second from the first pair (C3); then the second from the second pair (C4) so as to be distributed in a zig zag fashion around cylinder 2. Thus, as shown in FIG. 1 a generally alternating 'V' then 'A' arrangement is provided. (In the orientation of FIG. 1a: an A between C1-C2; a V between C2-C3; an A between C3-C4; and a V between C4-C1.

When inflated, the curved chambers produce a force applied on the surface of the hollow cylinder 2, which can be decoupled in two components. A non-predominant (NP) force, is defined as the component on the plane X-Y, and a predominant force, perpendicular to the NP force in the Z direction. The NP forces play an important role for the dexterity of the actuator, as described in more detail below and with reference to FIGS. 5 to 12.

The combined activation of two adjacent chambers (Cs) cancels part of the NP components, whilst activating diagonally opposed chambers doubles the effect of the NP components. When adjacent chambers are activated (C1-C2, C3-C4, C1-C4, C2-C3), part of the NP components have opposite direction and are absorbed by the actuator's structure. This results in a rotation along the X axis (C1-C2 positive, C3-C4, negative) or Y axis (C1-C4 positive, C2-C3 negative). (Positive in this context refers to an increase of pressure, negative a decrease in pressure, of the chambers referred to). When diagonal chambers are activated (C2-C4, C1-C3), the NP components have opposite direction but different application point. This produces a torque applied to the central hollow ring, and ends 4,6, resulting in twisting in a positive i.e. clockwise direction of end 6 relative to end 4 (C2-C4) or in a negative i.e. anti-clockwise direction (C1-C3). Thus a rotation about the z axis is achieved. To avoid collapse of the inner hollow cylinder 2 (top and lower section) due to the softness of the material, the two stiffer end parts 4,6 reinforce the top and the bottom of the actuator. This stiffening of, the top and bottom sections of the actuator, produces a rotation avoiding squeezing of the internal hollow section of the actuator. The central aperture 8 is kept open.

The angle between the chambers C1, C2, C3 and C4 and the vertical Z axis, named a, (FIGS. 6 and 9), changes with the extension of the chamber, resulting in a different behaviour of the actuator 1 during its motion, as explained in further detail below.

An example of a manufacturing process, the range of motion of the actuator and effect of the curved chamber on its dexterity will now be described.

Mould Construction

Figure 2:
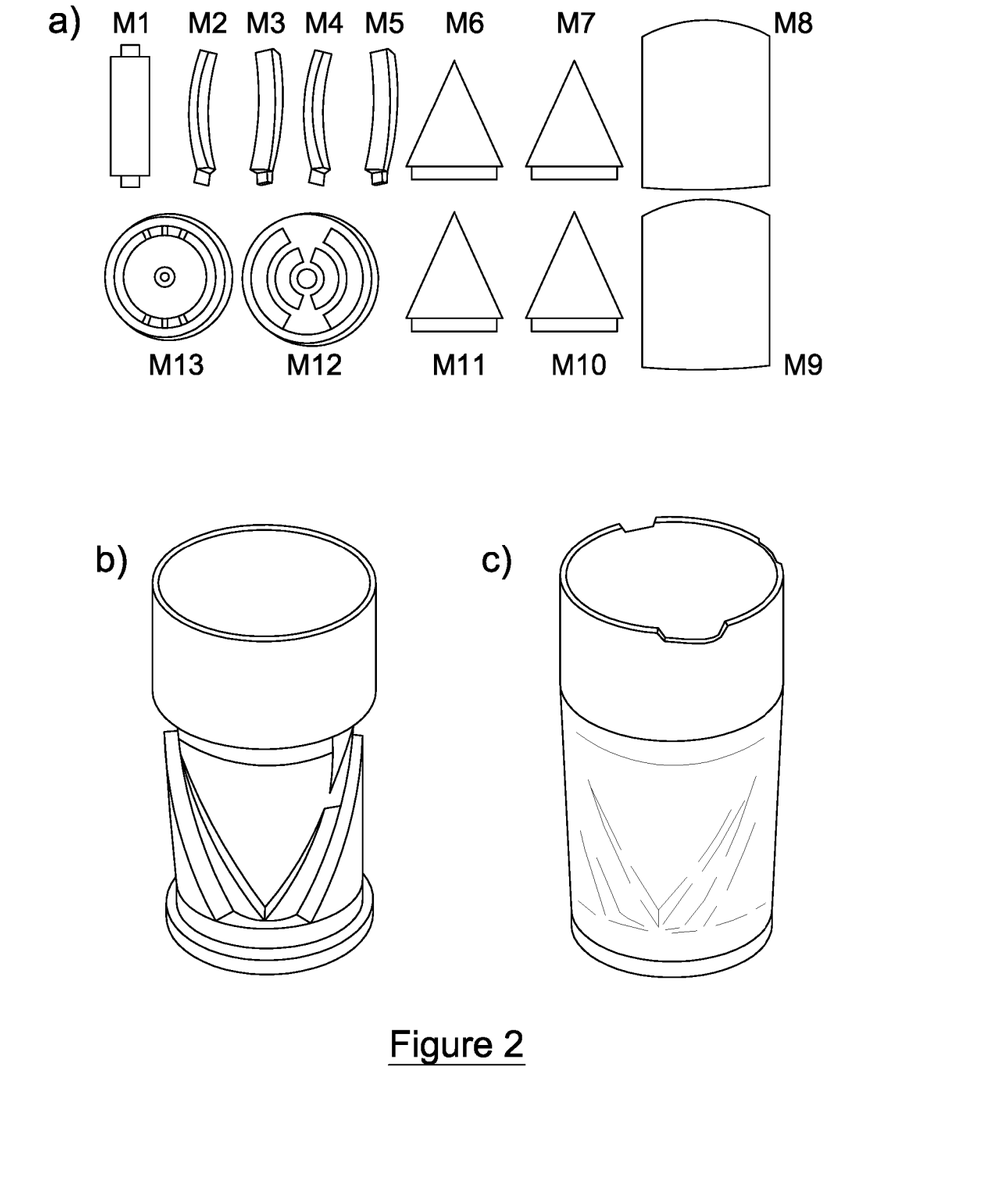
FIG. 2a shows mould components for an actuator.
FIG. 2b shows the mould part assembled.
FIG. 2c shows the mould fully assembled.

Silicone rubber Ecoflex® 00-30 (shore hardness=00-30, tensile strength=200 psi/1.38 MPa, 100% modulus=10 psi/68.95 kPa, elongation at break of 900%), was selected due to its high stretchability and low tensile modulus. The actuator was produced by using a 3D printed mould as shown in FIG. 2a. The mould is modular and composed of 13+1 parts in order to simplify the removal of the silicon actuator after the material is cured. Four chambers are made by using the moulds M2, M3, M4, M5, connected to the bottom top part of the chambers, M12, M13. The top part is connected by 4 pins, in order to align the chambers (M2, M3, M4, M5) and keep four holes in the cast, for the insertion of tubes. The lower part of each chamber, is connected with the bottom part of the mould by using a central pin (M1), leaving four open sections, which requires a secondary process. Additional 4 parts of the mould, (M6, M7, M10, M11) are used to define the outer shape of the actuator. Half cylinder parts M8, M9, are used to close the outer surface part of the mould. They are made of transparent material to verify the alignment of the internal part of the mould. FIG. 2b shows the assembled mould, apart from M8, M9. FIG. 2c the complete mould ready for filling.

Casting

Figure 3:
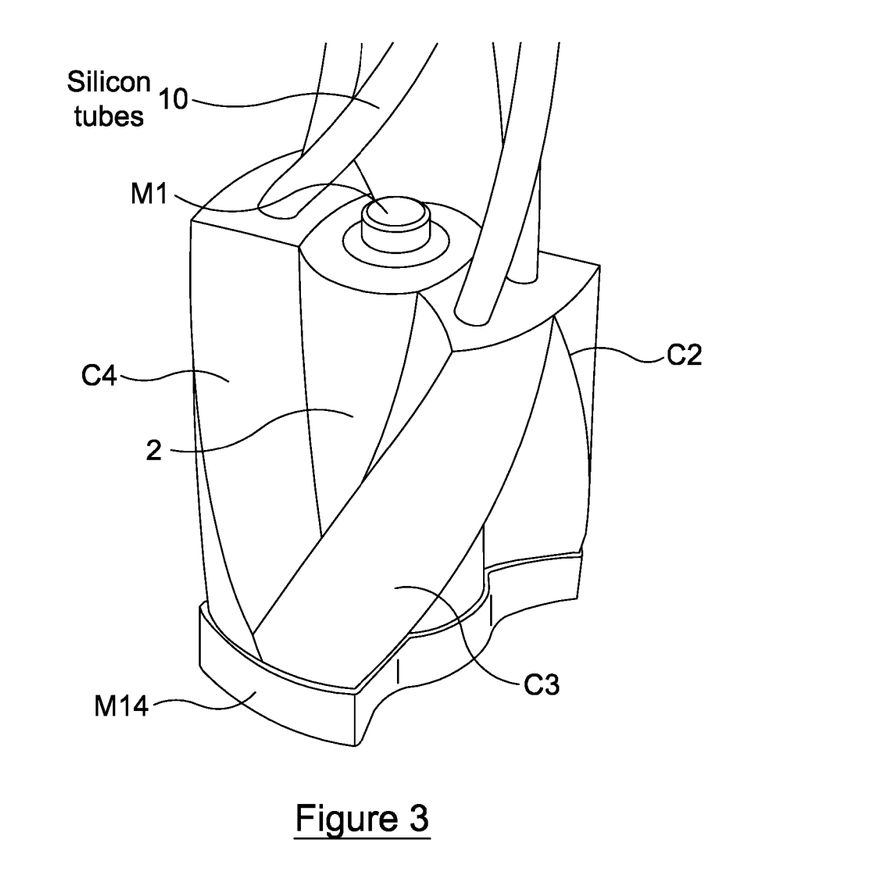
FIG. 3 shows a secondary moulding process.
Figure 4:
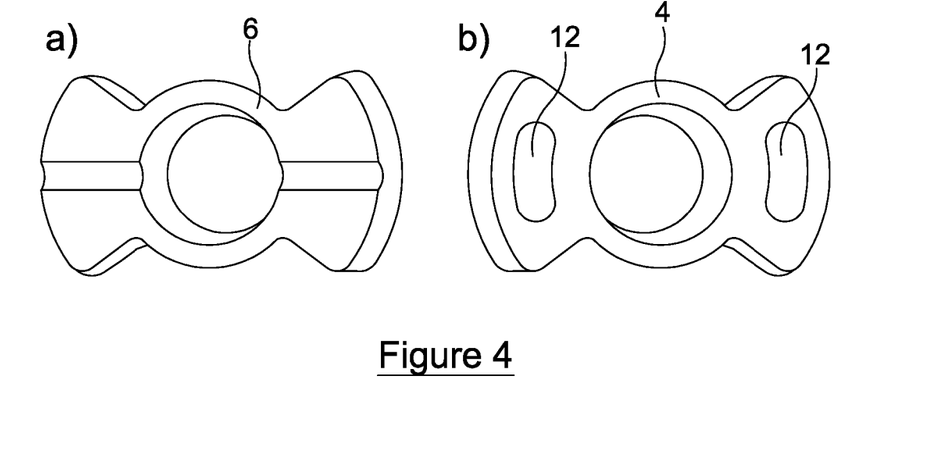
FIGS. 4a and 4b show first and second ends of an actuator.

Ecoflex® 00-30 parts A and B are mixed with in a 1:1 ratio, and degassed under vacuum for 10 minutes, to remove any air and avoid bubble formation in the final cast. The mixture is then poured into the assembled mould (FIG. 2-c) and cured, either at room temperature for 4 hours or, the process can be speeded up by heating in an oven at 60 degrees Celsius for 30 minutes. After curing, the lateral, top and bottom parts of the mould are removed (M8, M9, M12, M13, M6, M7, M10, M11). The moulds inside the chambers are removed (M2, M3, M4, M5) leaving the actuator with only the inner cylinder (M1), needed to keep the central part stiff and to facilitate its manipulation for the subsequent stage. An additional mould (M14) is used to close (seal) the lower (in this view) part of the actuator, again using Ecoflex 00-30, as shown in FIG. 3. At the same time, four silicon tubes 10 with an external diameter of 2.1 mm are glued into the upper (in this view) holes of the actuator as shown in FIG. 3. The first and second ends 4,6 are stiffer parts (see FIG. 4) and are employed to reinforce the structure and keep the end surfaces plane, as well as to increase the rotation along Z axis. In this example they have an external diameter of 30 mm and a wall thickness of 0.5 mm, and are 3D printed by using VeroClear-RGB10 polymer (tensile strength 7,250-9,450 psi/50-65 MPa, modulus of elasticity 290,000-435,000/2,000-3,000 Mpa, elongation at break 10-25%).

Figure 5:
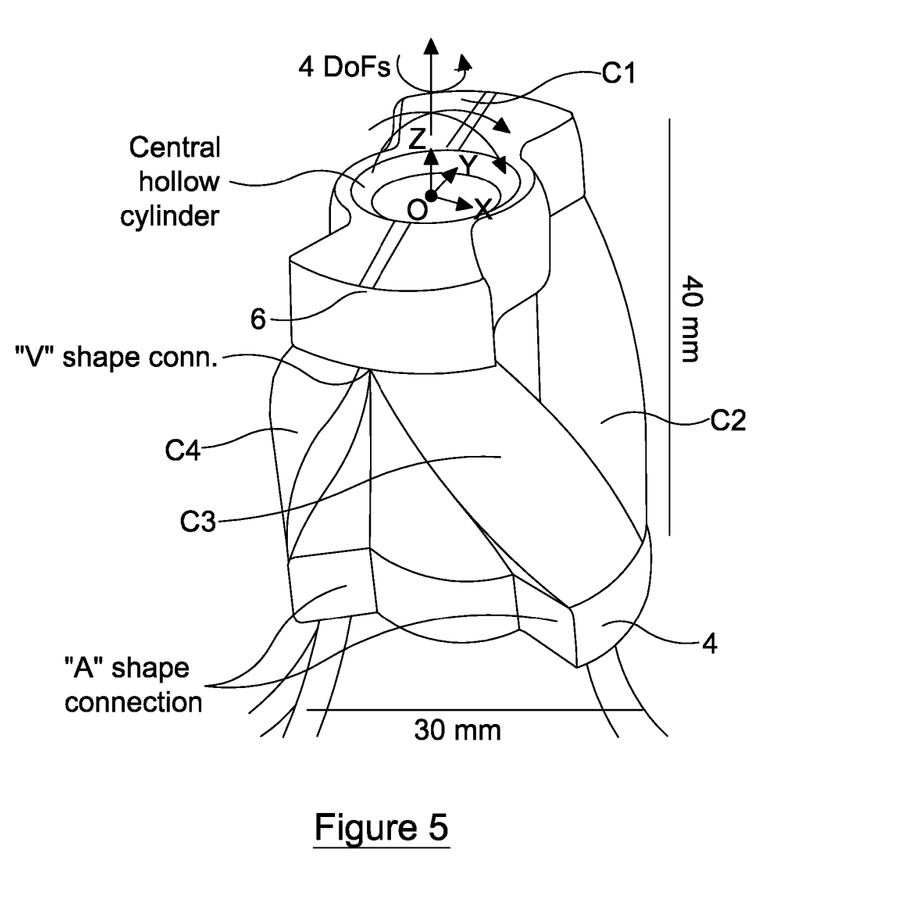
FIG. 5 shows an actuator of the invention in perspective view.

Both ends 4,6 are provided with a central aperture 7. Two further apertures 12 (open sections) at the first end 4 are needed to allow silicon tubes 10 to be connected to the chambers C1 to C4. Both, the first and second ends 4,6 are glued to the soft part of the actuator using superglue (cyanoacrylate adhesive). The prototype of this process is shown in FIG. 5 which is inverted with respect to FIG. 3.

Control

The control was designed to be affordable and ease of implementation, by using off-the-shelf components. A total of 8 electro-valves (EV), 4 to inflate (IVs) and 4 to deflate (DVs), are used to control the 4 chambers. The chambers are naturally deflated, opening the DVs and by using the internal pressure. Each chamber has an analogue pressure sensor (Honeywell model ASDXAVX015PGAA5), used to monitor the chambers pressure and to limit the maximal pressure applied to each chamber, in order to avoid any damage. An external compressor (GS AS18) provides the air for inflation of the chambers.

Both valves and sensors are connected to an Arduino board, which functions as a bridge interface (BI) and implements a low-level control (LLC). The role of the LLC is to activate-deactivate the EV, and acquire the 4 analogue pressure sensors. The role of the BI, is for data exchange with the external interface (EI) through a serial communication port. The high-level control (HLC) is implemented in Matlab® Simulink and includes a serial communication interface to the LLC and the Xbox One Wireless Controller. The control architecture aims to perform simple movements of the actuator by using an open-loop control and visual feedback by the operator.

Experiments and Discussion

The proposed actuator was tested by measuring the pressure and the range of motion for each DOF, described in detail in the following sections. Each test has been performed by replicating each DOF, 3 times and increasing the air volume at each step.

Bending

The actuator 1 is able to bend along X (C1-C2, C3-C4) and Y (C1-C4, C2-C3) axis, by activation of adjacent inflatable chambers. The central cylinder 2 works as a fulcrum about which the actuator can bend.

The behaviour of the actuator may be considered in terms of pressurising (activating) a pair of inflatable chambers that are adjacent when moving round the circumference of cylinder 2.

In this consideration the V shape is defined as the part of the actuator where the ends of two adjacent chambers contact at an end, with A shape being the opposite, where the two adjacent ends are spaced apart at an end, as indicated in FIG. 5.

When two adjacent chambers are activated, the V shape connection at an end behaves differently from the A shape connection at an end. Both, V and A shape connections, produce a force and a torque reaction from the cylinder 2, resulting in a bending and extension of the actuator.

FIGS. 6a to 6c illustrate a simplified representation of the forces configuration in both V and A shape connections. The forces acting on end 6 are labelled $F_1$ to $F_4$, corresponding to the chambers C1 to C4 respectively (chamber C1 and corresponding force $F_1$ not visible in this view). The two adjacent chambers' non-predominant (NP) force components are in the same plane: one component, along the X or Y axis, is equal but with opposite direction, hence absorbed by the structure; the other one, along Y or X axis, is equal but with the same direction, hence, producing the rotation of the actuator. When the actuator extends, $\alpha_i$ decreases in the V shape, and increases in the A shape, hence the NP forces decreases (FIGS. 6b, 6c).

In the A shape connection the central ring receives a force applied at a distance d2 (C1-C4 or C2-C3), lower than d1 in the V shape (C1-C2 or C3-C4). The angle $\alpha_i$ in the A shape, is higher than the V shape, and >3/2 π, therefore producing a force in the opposite direction. This results in a greater bending of the central ring in the A shape, than the V shape.

FIGS. 6d and 6e show the actuator bending in A shape (6-d), and V shape (6-e). Starting from the rest positions shown in the in the central view, inflation of the adjacent chambers causes the second end 6 to bend to the left or to the right until at approximately at right angles to the first end 4.

Figure 7:
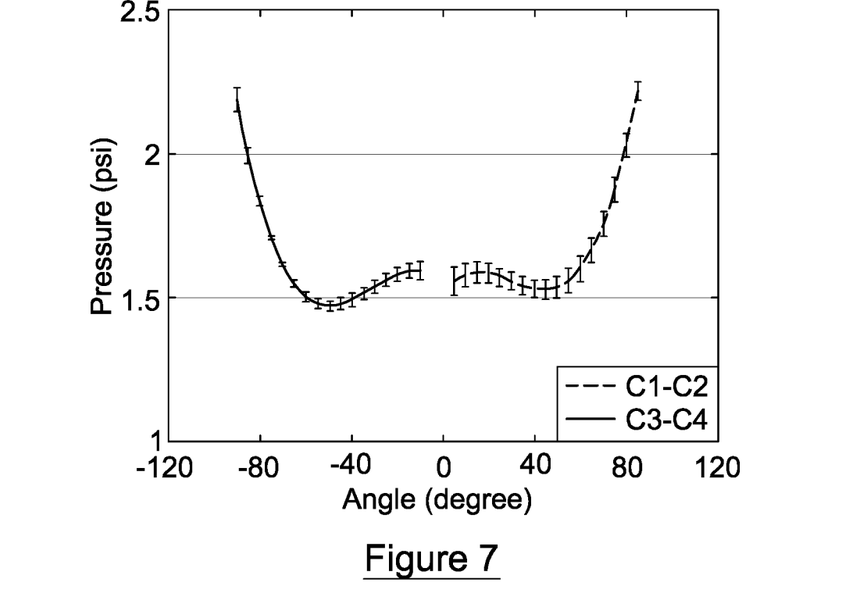
FIG. 7 shows graphically bending properties of an actuator.

FIG. 7 shows the graph of angle vs pressure when chamber C1-C2 (positive angle) and C3-C4 (negative angle) are activated (inflated to higher pressure).

Figure 8:
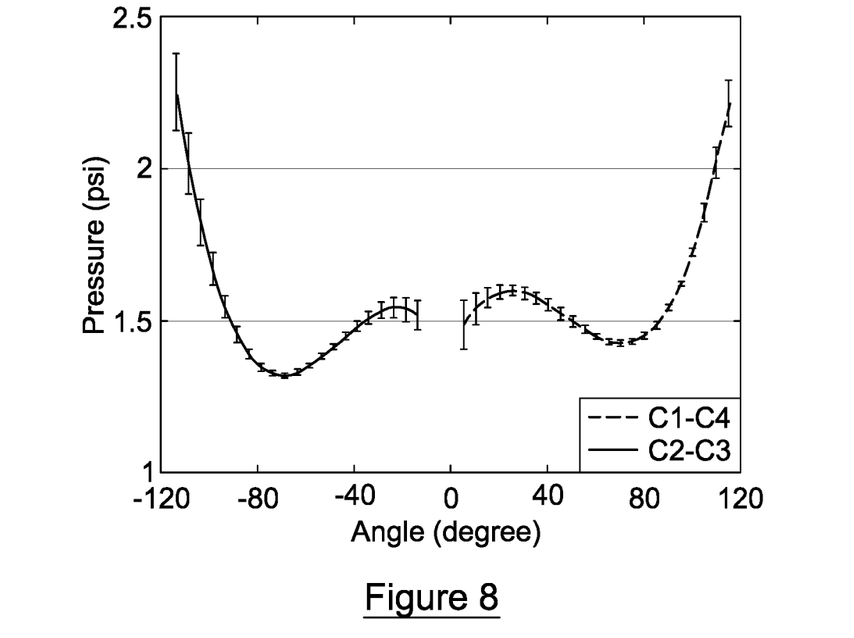
FIG. 8 shows graphically bending properties of an actuator.

FIG. 8 shows the graph of angle vs pressure when chamber C1-C4 (positive angle) and C2-C3 (negative angle) are activated.

All the graphs show four phases: i) activation, ii) motion—decreasing pressure, iii) motion—increasing pressure, and iv) saturation. The activation phase shows discontinuous pressure, resulting in a negligible movement of the tip of the actuator. This is considered as the activation pressure limit, which is the minimum value required to induce movement in the actuator. The phase ii), where the actuator starts to bend, results in a reduction of the pressure when the bending increases. This is related to two effects.

Figure 6:
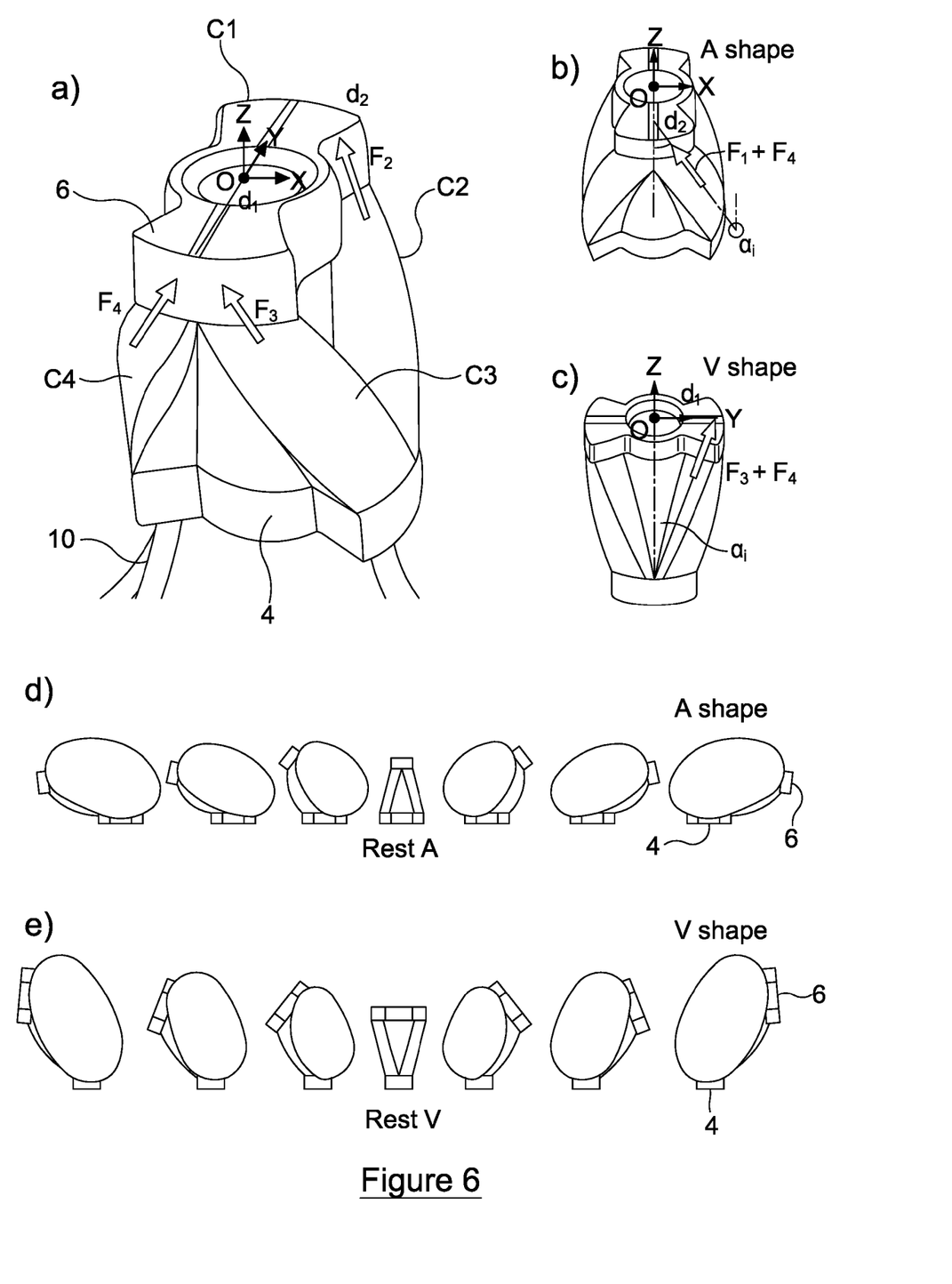
FIGS. 6a, 6b and 6c show an actuator in perspective views to illustrate forces applied.
FIGS. 6d and 6e show the same actuator bending.

The first one a) is that the angle $\alpha_i$ (FIG. 6) changes when the actuator starts to bend, reducing the NP components, hence having all the forces produced by the actuator in line with Z axis. This increases the torque applied to the tip of the actuator and therefore the bending. The second factor b) is that the central hollow is bent and become floppy, reducing its resistance, hence the pressure inside the chambers.

In phase iii), the pressure increases again till phase iv). In phase iv), the saturation of the actuator results in an increasing pressure with a negligible effect on bending. The range of motion along X axis is ±90° at 2.2 psi, and along Y axis ±115° at 2.3 psi.

Twisting (Rotation)

Figure 9:
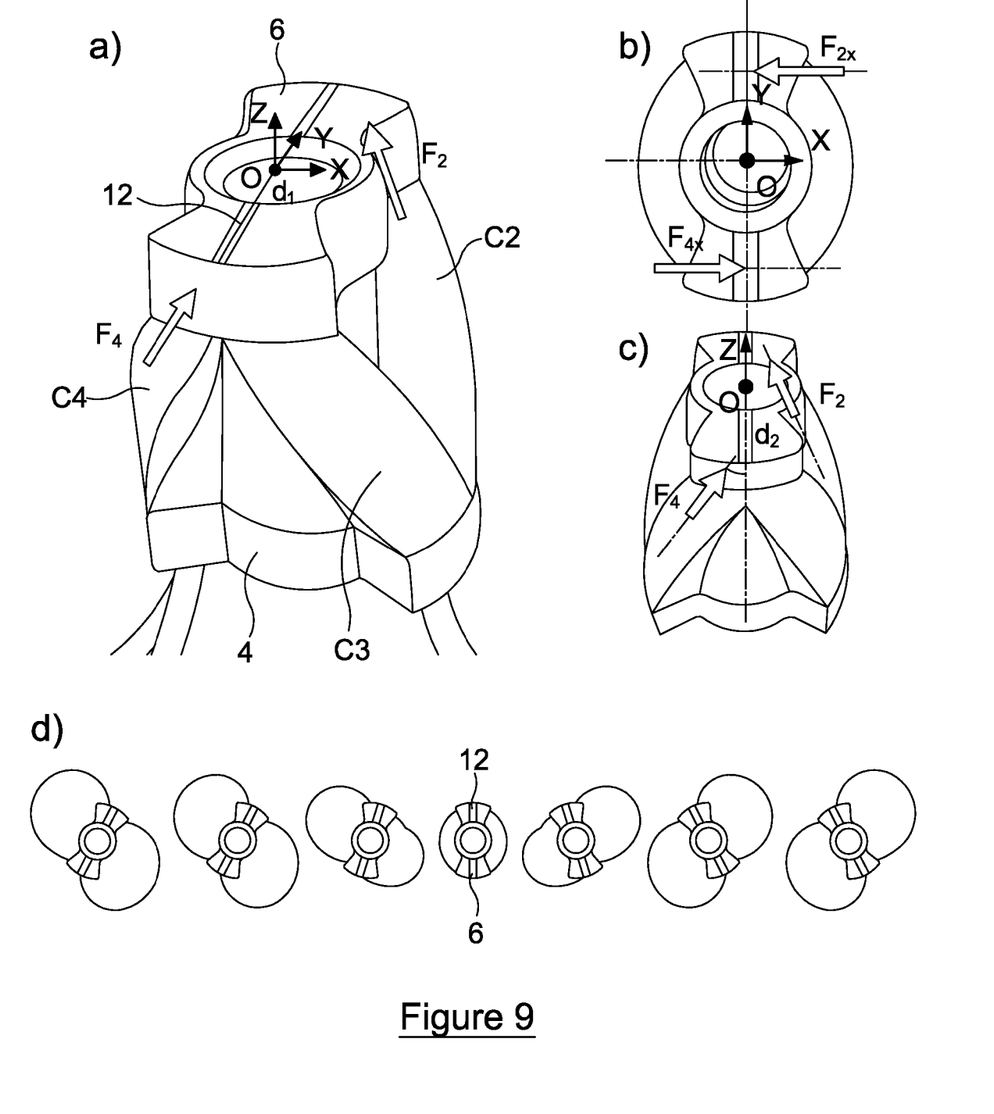
FIGS. 9a, 9b and 9c show an actuator in perspective, top and perspective views respectively, to illustrate forces applied for twisting (rotational) motion.
FIG. 9d shows top (plan) views of the same actuator twisting.

By activating diagonally opposed chambers, the actuator can twist and extend, as shown in FIG. 9, achieving a total range of ±30° at 2.1 psi. FIG. 9a shows the actuator in perspective with a datum line 12 marked on the top of second end 6 to show twisting more clearly. FIG. 9b shows a top view and 9c a front view. The activation of a pair of diagonal chambers (e.g. C2, C4), produces diagonal forces ($F_2$, $F_4$) composed of a predominant components along Z axis, and a part of the NP component along X (C1-C3), or Y (C2-C4). The NP component of each force ($F_2$, $F_4$) is composed of two forces. One is compensated by the activation of the other chamber, the other one is involved in the twisting of the actuator ($F_{2x}$ and $F_{4x}$ in this example).

The NP components involved in the rotation, are opposite in direction and applied at a distance of 2d1, producing a torque along the central hollow ring, positive (C2-C4) or negative (C1-C3), causing the rotation of the actuator in two directions. The NP components along the X-Y axis, are higher at the activation when $\alpha_i$ is higher, and they decrease when the actuator extends, consisting in a saturation as the rotational angle. FIG. 9d shows the twisting (rotation about the Z axis) viewed from above. From the central, at rest, position clockwise or anti clockwise rotation can be achieved.

Figure 10:
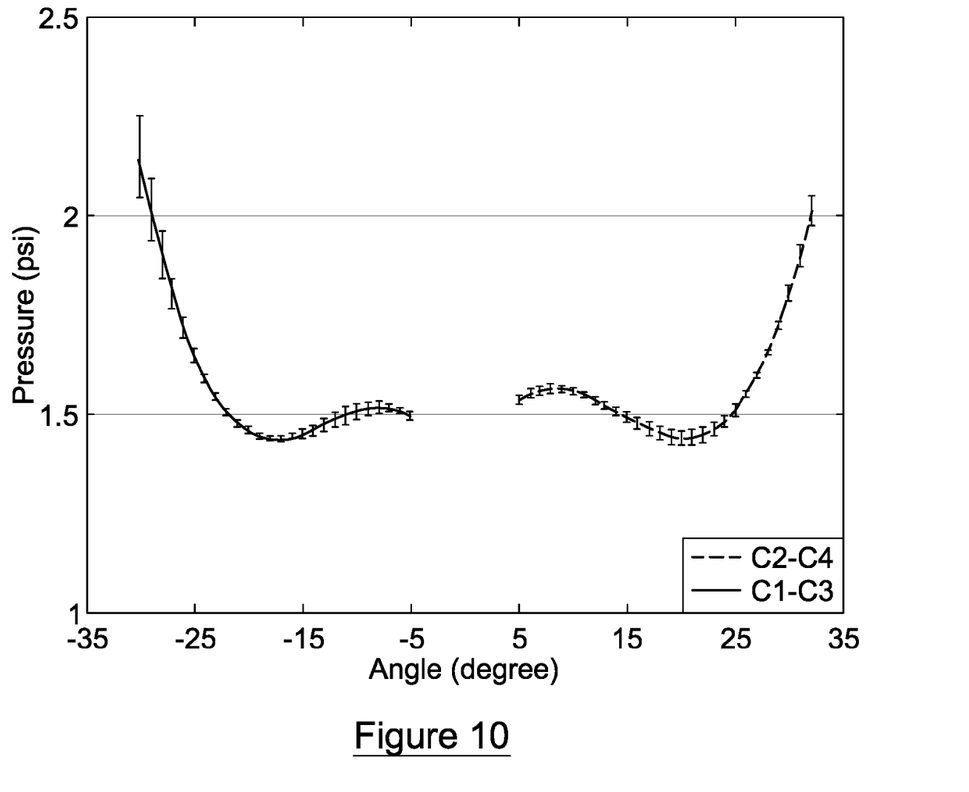
FIG. 10 shows graphically, twisting (rotation) properties of an actuator.

FIG. 10 outlines the twisting performance. The rotation is focused in a small range of pressure. Higher pressures result in an extension of the actuator after this preliminary phase.

Extension

Figure 11:
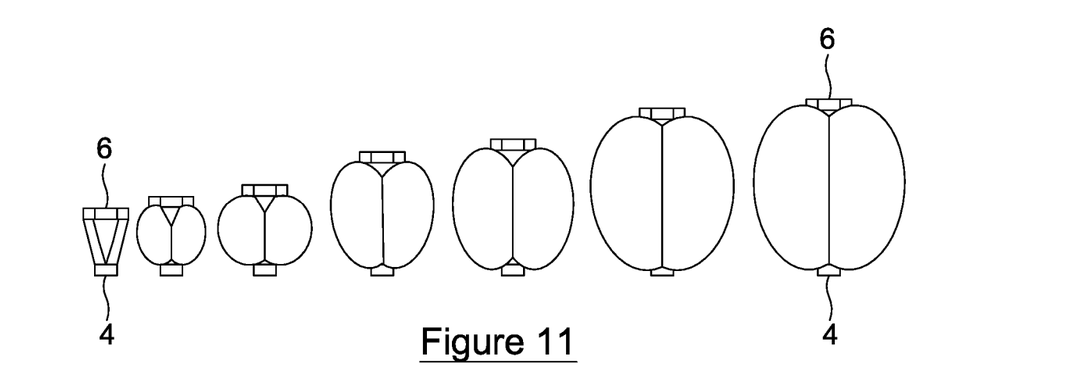
FIG. 11 shows elevation views of an actuator extending in length.
Figure 12:
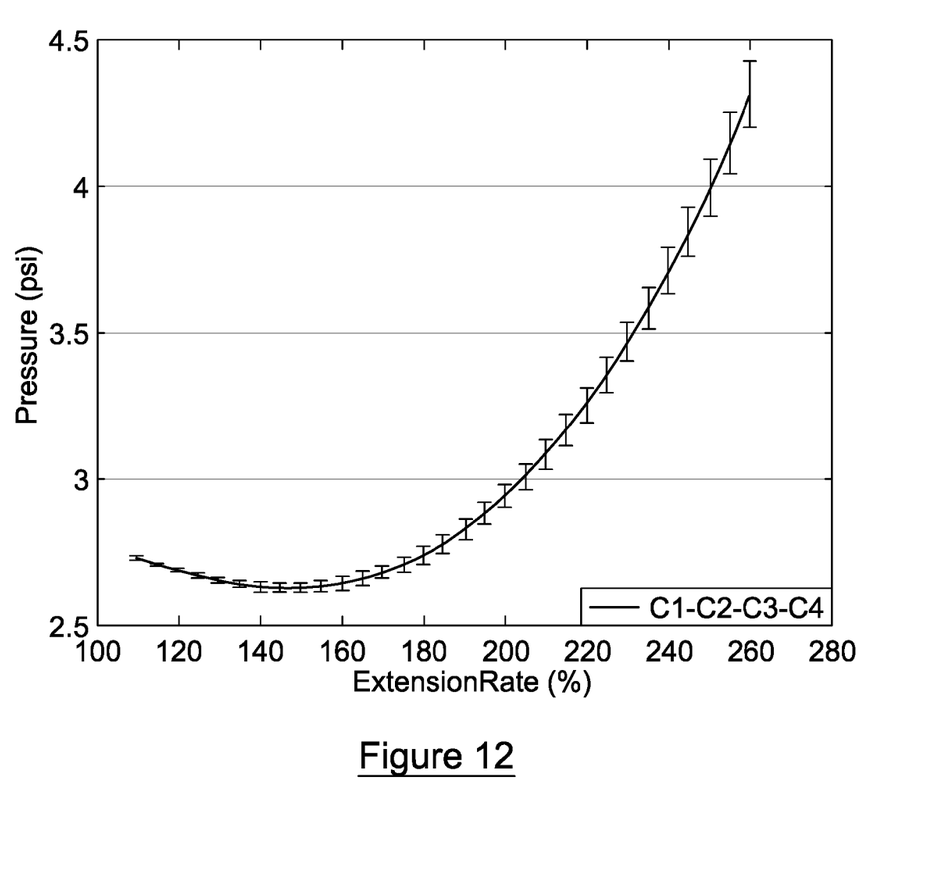
FIG. 12 shows graphically extension properties of an actuator.

Activating all the chambers C1-C2-C3-C4 together, as shown in FIG. 11, extends the actuator by up to 300% or more of the initial length, at 4.2 psi. From the left hand at rest front elevation view, the first and second ends 4,6 move away from each other to the fully extended right hand view. Radial expansion occurs with the same percent as the extension. FIG. 12 shows the extension performance of the actuators. After the activation phase, the air volume increases, although the pressure decreases, as discussed for the other DOF motions.

Positive and negative values are shown in all graphs (FIG. 7, 8, 10), in both bending and twisting experiments, they are not perfectly symmetric. This phenomenon is due to the non-symmetry distribution of wall thickness in all the chambers, caused by the moulding process. All the reported graphs show a pressure that decreases after the first activation phase ii), and then increases, phase iii). This implies that the actuator may not be controlled using a pressure sensory feedback. Hence, a closed-loop control is desired and can be implemented by using the orientation of the top part of the actuator, (e.g. by using an inertial sensory unit, or a tracking system) and the volume of the inflated air, as the control parameters. Pressure sensors, can be used as a safety control to monitor the stress of the material.

Summary of Prototype Testing

The invention provides a Hollow Soft Pneumatic Actuator (HOSE) with 4 DOFs and a manufacturing process therefor. Performance of the actuator was evaluated in terms of range of motion versus the applied pressure. The control components are off-the-shelf and easy to implement. The actuator performance has shown to exhibit dexterity along each DOF with a low input pressure, less than 2 psi. The hollow central part may be used for cabling the actuation tubes and electrical cables to embed any electronic board on the top part of the actuator for implementing more complex tasks.

The range of rotation is related to the overall length of the actuator, the curved shape of the chamber and the wall thickness. The control system has been implemented to perform simple movements by using an Xbox® One Wireless Controller. A closed-loop control may be provided, by using additional sensors to detect the position and orientation of the top part of the actuator.

As will be appreciated by the skilled person, a modular actuator based on the present invention may further comprise onboard electronics and embedded small valves, to control actuator function. The invention may further extend to a complex manipulator comprising one or more modular actuators as described above. For example, a robot or a robotic arm. The simple manufacturing process allows the present invention to be miniaturized and be used for several applications with a limited operative space. The actuator's dexterity of movement can be an advantage for applications such as manipulation of surgical instrument end effectors or positioning endoscopic cameras for inspection of body lumens.

REFERENCES

[1] L. Sciavicco, B. Siciliano, and B. Sciavicco, Modelling and Control of Robot Manipulators, 2nd ed. Secaucus, N.J., USA: Springer-Verlag New York, Inc., 2000.

[2] B. Vanderborght, A. Albu-Schaeffer, A. Bicchi, E. Burdet, D. Caldwell, R. Carloni, M. Catalano, O. Eiberger, W. Friedl, G. Ganesh, M. Garabini, M. Grebenstein, G. Grioli, S. Haddadin, H. Hoppner, A. Jafari, M. Laffranchi, D. Lefeber, F. Petit, S. Stramigioli, N. Tsagarakis, M. V. Damme, R. V. Ham, L. Visser, and S. Wolf, "Variable impedance actuators: A review," Robotics and Autonomous Systems, vol. 61, no. 12, pp. 1601-1614, 2013. [Online]. Available: http://www.sciencedirect.com/science/article/pii/S0921889013001188

[3] D. Rus and M. T. & Tolley, "Design, fabrication and control of soft robots." Nature, vol. 521, pp. 467-475, 2015. [Online]. Available: http://www.nature.com/nature/journal/v521/n7553/abs/nature14543.html

[4] C. Laschi, M. Cianchetti, B. Mazzolai, L. Margheri, M. Follador, and P. Dario, "Soft robot arm inspired by the octopus," Advanced Robotics, vol. 26, no. 7, pp. 709-727, 2012. [Online]. Available: http://dx.doi.org/10.1163/156855312X626343

[5] B. Mazzolai, L. Margheri, M. Cianchetti, P. Dario, and C. Laschi, "Soft-robotic arm inspired by the octopus: li. from artificial requirements to innovative technological solutions," Bioinspiration & Biomimetics, vol. 7, no. 2, p. 025005, 2012. [Online]. Available: http://stacks.iop.org/1748-3190/7/i=2/a=025005

[6] M. Cianchetti, A. Arienti, M. Follador, B. Mazzolai, P. Dario, and C. Laschi, "Design concept and validation of a robotic arm inspired by the octopus," Materials Science and Engineering: C, vol. 31, no. 6, pp. 1230-1239, 2011, principles and Development of Bio-Inspired Materials. [Online]. Available: http://www.sciencedirect.com/science/article/pii/S0928493110003450

[7] M. W. Hannan and I. D. Walker, "The 'elephant trunk' manipulator, design and implementation," in Advanced Intelligent Mechatronics, 2001. Proceedings. 2001 IEEE/ASME International Conference on, vol. 1, 2001, pp. 14-19 vol. 1.

[8] Y. Yang and W. Zhang, "An elephant-trunk manipulator with twisting flexional rods," in 2015 IEEE International Conference on Robotics and Biomimetics (ROBIO), December 2015, pp. 13-18.

[9] M. Rolf and J. J. Steil, "Efficient exploratory learning of inverse kinematics on a bionic elephant trunk," IEEE Transactions on Neural Networks and Learning Systems, vol. 25, no. 6, pp. 1147-1160, June 2014.

[10] H.-T. Lin, G. G. Leisk, and B. Trimmer, "Goqbot: a caterpillar-inspired soft-bodied rolling robot," Bioinspiration & Biomimetics, vol. 6, no. 2, p. 026007, 2011. [Online]. Available: http://stacks.iop.org/1748-3190/6/i=2/a=026007

[11] G. Sumbre, G. Fiorito, T. Flash, and B. Hochner, "Octopuses use a human-like strategy to control precise point-to-point arm movements," Current Biology, vol. 16, no. 8, pp. 767-772, 2006. [Online]. Available: http://www.sciencedirect.com/science/article/pii/S0960982206012747

[12] L. Margheri, C. Laschi, and B. Mazzolai, "Soft robotic arm inspired by the octopus: I. from biological functions to artificial requirements," Bioinspiration & Biomimetics, vol. 7, no. 2, p. 025004, 2012. [Online]. Available: http://stacks.iop.org/1748-3190/7/i=2/a=025004

[13] B. Tondu, "Modelling of the McKibben artificial muscle: A review," Journal of Intelligent Material Systems and Structures, vol. 23, no. 3, pp. 225-253, 2012. [Online]. Available: http://jim.sagepub.com/content/23/3/225.abstract

[14] F. Rothling, R. Haschke, J. J. Steil, and H. Ritter, "Platform portable anthropomorphic grasping with the bielefeld 20-DOF shadow and 9-DOF turn hand," in 2007 IEEE/RSJ International Conference on Intelligent Robots and Systems, October 2007, pp. 2951-2956.

[15] B.-S. Kang, "Compliance characteristic and force control of antagonistic actuation by pneumatic artificial muscles," Meccanica, vol. 49, no. 3, pp. 565-574, 2014. [Online]. Available: http://dx.doi.org/10.1007/s11012-013-9811-y

[16] K. Suzumori, S. Iikura, and H. Tanaka, "Flexible microactuator for miniature robots," in Micro Electro Mechanical Systems, 1991, MEMS '91, Proceedings. An Investigation of Micro Structures, Sensors, Actuators, Machines and Robots. IEEE, January 1991, pp. 204-209.

[17]—, "Development of flexible microactuator and its applications to robotic mechanisms," in Robotics and Automation, 1991. Proceedings, 1991 IEEE International Conference on, April 1991, pp. 1622-1627 vol. 2.

[18] F. Connolly, P. Polygerinos, C. J. Walsh, and K. Bertoldi, "Mechanical programming of soft actuators by varying fiber angle," Soft Robotics, vol. 2, pp. 26-32, 2015.

[19] R. F. Shepherd, F. Ilievski, W. Choi, S. A. Morin, A. A. Stokes, A. D. Mazzeo, X. Chen, M. Wang, and G. M. Whitesides, "Multigait soft robot," Proceedings of the National Academy of Sciences, vol. 108, no. 51, pp. 20 400-20 403, 2011. [Online]. Available: http://www.pnas.org/content/108/51/20400.abstract

[20] R. V. Martinez, A. C. Glavan, C. Keplinger, A. I. Oyetibo, and G. M. Whitesides, "Soft actuators and robots that are resistant to mechanical damage," Advanced Functional Materials, vol. 24, no. 20, pp. 3003-3010, 2014. [Online]. Available: http://dx.doi.org/10.1002/adfm.201303676

[21] S. W. Kwok, S. A. Morin, B. Mosadegh, J.-H. So, R. F. Shepherd, R. V. Martinez, B. Smith, F. C. Simeone, A. A. Stokes, and G. M. Whitesides, "Magnetic assembly of soft robots with hard components," Advanced Functional Materials, vol. 24, no. 15, pp. 2180-2187, 2014. [Online]. Available: http://dx.doi.org/10.1002/adfm.201303047

[22] R. K. K. Andrew D. Marchese and D. Rus, "A recipe for soft fluidic elastomer robots," Soft Robotics, vol. 1, no. 2, pp. 7-25, 2015. [Online]. Available: http://online.liebertpub.com/doi/abs/10.1089/soro.2014.0022

[23] OCTOPUS IP, FP7-ICT 2007.8.5, FET Proactive, Embodied Intelligence, url=http://www.octopusproject.eu.

[24] STIFF-FLOP IP, FP7-ICT-2011.2.1, Cognitive Systems and Robotics, url=http://www.stiff-flop.eu/.

[25] M. Cianchetti, T. Ranzani, G. Gerboni, I. D. Falco, C. Laschi, and A. Menciassi, "Stiff-flop surgical manipulator: Mechanical design and experimental characterization of the single module," in 2013 IEEE/RSJ International Conference on Intelligent Robots and Systems, November 2013, pp. 3576-3581.

[26] C. D. Onal, X. Chen, G. M. Whitesides, and D. Rus, Soft Mobile Robots with On-Board Chemical Pressure Generation. Cham: Springer International Publishing, 2017, pp. 525-540.

[27] M. Wehner, R. L. Truby, D. J. Fitzgerald, B. Mosadegh, G. M. Whitesides, J. A. Lewis, and R. J. Wood, "An integrated design and fabrication strategy for entirely soft, autonomous robots," Nature, vol. 536, pp. 451-466, 2016.

[28] R. J. Webster and B. A. Jones, "Design and kinematic modeling of constant curvature continuum robots: A review," The International Journal of Robotics Research, 2010. [Online]. Available: http://ijr.sagepub.com/content/early/2010/06/09/0278364910368147.abstract

[29] T. Ranzani, G. Gerboni, M. Cianchetti, and A. Menciassi, "A bioinspired soft manipulator for minimally invasive surgery," Bioinspiration & Biomimetics, vol. 10, no. 3, p. 035008, 2015. [Online]. Available: http://stacks.iop.org/1748-3190/10/i=3/a=035008

[30] A. D. Greef, P. Lambert, and A. Delchambre, "Towards flexible medical instruments: Review of flexible fluidic actuators," Precision Engineering, vol. 33, no. 4, pp. 311-321, 2009. [Online]. Available: http://www.sciencedirect.com/science/article/pii/S0141635908001190

The invention claimed is:

1. An actuator comprising:
   a first end and a second end defining an axis there between; and
   at least four inflatable chambers;
      wherein each one of the at least four inflatable chambers is resiliently deformable, elongate, and extends axially between the first end and the second end and circumferentially about a central core defined between the first end and the second end;
      wherein a first pair of the at least four inflatable chambers is contra rotatory about the central core to a second pair of the four inflatable chambers;
      such that a pressure change in one or more of the at least four inflatable chambers causes motion of the first end relative to the second end; and
      the at least four inflatable chambers being distributed symmetrically about the central core,
      wherein each of the at least four inflatable chambers is directly attached to the central core, the central core being made from a resiliently deformable material.

2. The actuator of claim 1 wherein the central core is hollow.

3. The actuator of claim 1 wherein the central core is generally cylindrical in form.

4. The actuator of claim 1 wherein each of the at least four inflatable chambers extends into direct operational contact with both the first and second ends.

5. The actuator of claim 1 wherein the at least four inflatable chambers alternate circumferentially, one from the first pair then one from the second pair, so as to be distributed in a zig zag fashion about the central core.

6. The actuator of claim 1 wherein each of the at least four inflatable chambers is attached to the central core of a resiliently deformable material and the first and second ends are of a stiffer material than that of the central core.

7. The actuator of claim 1 wherein the central core is hollow and the first and second ends of the actuator are each provided with an aperture extending there through in an axial direction and in communication with the central core.

8. The actuator of claim 1 further comprising a pneumatic circuit or a hydraulic circuit for selectively increasing and/or decreasing the pressure within each of the at least four inflatable chambers by supply of a fluid.

9. The actuator of claim 1 wherein the at least four inflatable chambers are self-supporting at least when partially inflated and the central core is a space between them.

10. The actuator of claim 1 further comprising a control system for controlling pressure changes within the at least four inflatable chambers.

11. A robot or a robotic arm comprising a plurality of actuators according to claim 1.

* * * * *